Sept. 2, 1924.
G. DILLMAN
TIRE SIGNAL
Filed June 20, 1923
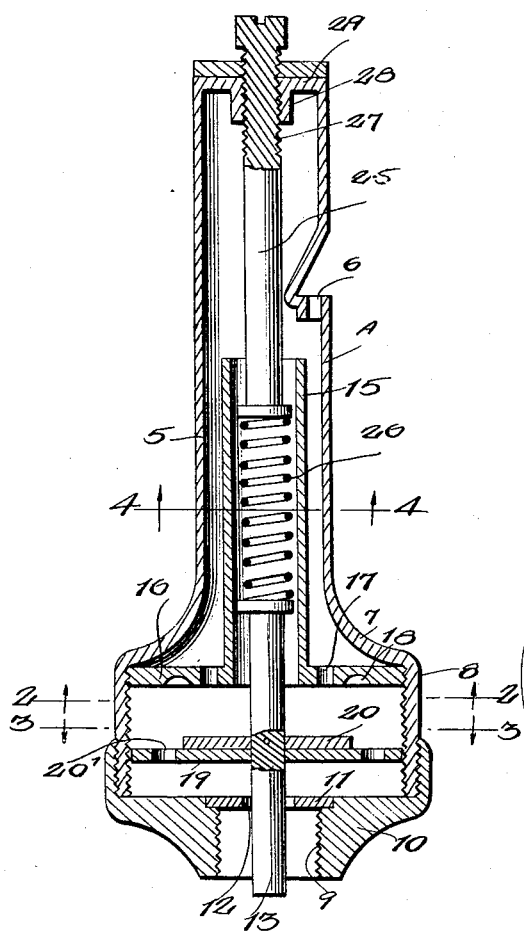
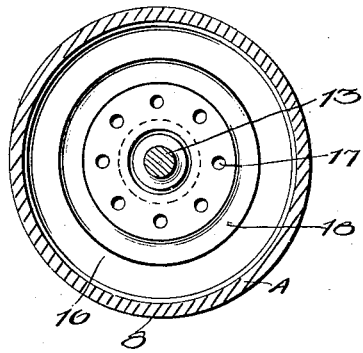
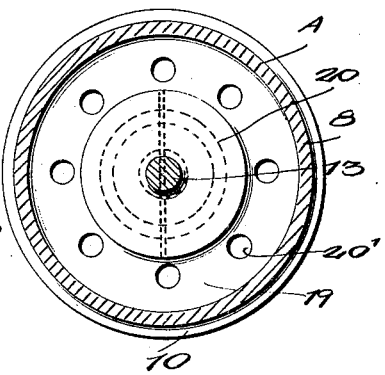
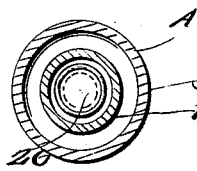
WITNESSES
L. Havalson
George H. Wright
Inventor
George Dillman,
By Richard B. Owen.
Attorney Patented Sept. 2, 1924.

1,507,546

UNITED STATES PATENT OFFICE.

GEORGE DILLMAN, OF RATON, NEW MEXICO.

TIRE SIGNAL.

Application filed June 20, 1923. Serial No. 646,674.

*To all whom it may concern:*

Be it known that I, GEORGE DILLMAN, a citizen of the United States, residing at Raton, in the county of Colfax and State of New Mexico, have invented certain new and useful Improvements in a Tire Signal, of which the following is a specification.

This invention relates to attachments for the pneumatic tires of motor vehicles and the primary object of the present invention is to provide a simplified type of signal, for giving an alarm when the pressure in the pneumatic tires goes below a predetermined degree, thereby effectively preventing the injury to tires due to too little air therein.

Another prime object of the present invention is to provide an attachment for connection with the ordinary tire filling valve of the inner tube of the tire embodying means for permitting the escape of the air from the inner tube, when the pressure of the air falls below a predetermined degree, and means actuated by the escaping air for sounding an alarm, so that the attention of the driver of the vehicle will be called to the fact that his tires need attention.

A further object of the invention is to provide novel means for adjusting the attachment so that the same will be set in operation at any desired air pressure.

A still further object of the invention is to provide an improved air alarm for pneumatic tires of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, in which drawings:

Figure 1 is a longitudinal section through the improved tire signal.

Figure 2 is a detail section taken on the line 2—2 of Figure 1 looking in the direction of the arrows and showing the valve seat.

Figure 3 is a section taken on the line 3—3 of Figure 1 looking in the direction of the arrows showing the novel valve and operating plunger.

Figure 4 is a detail section taken on the line 4—4 of Figure 1.

Referring to the drawings in detail, wherein similar reference characters designate corresponding parts throughout the several views, the letter A generally indicates the improved tire alarm, which comprises a cylindrical body 5, the outer portion of which forms the body for the whistle, and as shown this body is provided with an outlet 6 through which the air is adapted to flow to cause the sounding of the whistle. It is to be understood of course that when the air is flowing from the whistle, that this will indicate that the tire needs more air. The lower end of the hollow cylindrical body 5 is flared outwardly as at 7 and enlarged to form a casing 8. The casing 8 has threaded thereon a closure head 10 which is provided with a threaded bore 9 for receiving the upper end of the ordinary threaded body of the tire filling valve (not shown). The inner surface of the head 10 carries a leather valve seat 11, the purpose of which will be hereinafter more fully described. The valve seat 11 is provided with an axial guide opening 12, through which the operating plunger 13 is adapted to extend, as will be hereinafter more fully apparent.

Arranged axially within the body 5 and in spaced relation to the inner surface thereof is a guide housing 15, the inner end of which terminates in a disk-shaped flat attaching plate 16, which is secured in any preferred way to the inner surface of the housing 8. Suitable air escape openings 17 are formed in the disk-shaped plate 17 and the inner surface of the body is provided with a groove 18 and this plate forms a valve seat, the purpose of which will be hereinafter more fully described.

The operating plunger 13 extends through the housing 8 and into the casing 15 and has secured thereto the operating plunger 19. The plunger 19 adjacent to its periphery is provided with air escape openings 20', the purpose of which will also be hereinafter more fully apparent. The plunger 19 also carries a leather check valve 20, which is adapted to engage the inner surface of the plate 16 and to cover the openings 17 so as to normally prevent the escape of air therethrough. It is to be noted that when the leather check valve 20 engages the plate 16, that the periphery thereof will be positioned adjacent to the groove 18, which tends to make an airtight joint and prevent the escape of air around the edges of the valve.

Now the plunger 13 normally extends beyond the head 10 and is adapted to engage the usual valve stem of the ordinary air filling valve of the pneumatic tire and is arranged to normally unseat this valve.

An adjusting rod 25 extends through the whistle body 5 into the casing 15 and an expansion spring 26 is arranged in the casing 15 between the plunger 13 and the adjusting rod 25 and this spring normally tends to move the flap check valve 20 away from its seat or plate 16. As shown, the upper end of the adjusting rod 25 is provided with external threads 27 which engage an internally threaded sleeve 28 carried by the outer end or wall 29 of the body 5.

Now it is obvious that the rod 25 can be adjusted so as to adjust the tension of the spring 26.

In operation of the improved tire signal the head 10 is threaded on the ordinary valve body (not shown), of the pneumatic tire filling valve and the plunger 13 engaging the valve stem of the ordinary tire filling valve will unseat the same and allow the air to escape into the casing 8. The air acting upon the plunger 19 will force the same outwardly against the tension of the spring 26 and urge the valve 20 on its seat 18 which will prevent further escape of air from the casing 8.

Now when the air in the tire goes below a predetermined degree, the tension of the spring 26 will press inward on the plunger 13 carrying the valve 20 away from the plate or valve seat 16, which will permit the escape of air into the body 5 and through the opening 16 which will cause the operation of the whistle and thus serve to call attention to the driver of the vehicle that a tire needs attention. As the air pressure in the tire decreases, the spring 26 will urge the plunger 19 downward into engagement with the leather washer or valve seat 11 and thus prevent further escape of air from the tire and thus hold a predetermined amount of air in the tire until the driver of the vehicle places more air into the same.

Now by adjusting the tension of the spring 26, the signal can be made to operate at any desired air pressure.

What I claim as new is:

In a low pressure tire alarm, a whistle body, an enlarged casing formed on the inner end of the whistle body, a head detachably connected to the casing for engaging the ordinary tire valve filling body, the head carrying a valve seat, a second valve seat threaded in the body, an axially disposed guide formed on the second valve seat and extending into the whistle body, a plunger reciprocally mounted in the casing, a plunger rod connected with the plunger and extending outwardly of the head and into said guide, a valve body carried by the plunger and arranged to sit upon the valve seat in the casing and the valve seat carried by the head, resilient means for normally urging the plunger away from the valve seat in the casing and on the valve seat in the head, and a rod mounted in the guide for adjusting the tension of the spring, as and for the purpose specified.

In testimony whereof I affix my signature in presence of two witnesses.

GEORGE DILLMAN.

Witnesses:
JAMES J. CAMPBELL,
BERT CASSAN.